United States Patent [19]

Yoshida et al.

[11] Patent Number: 4,634,275

[45] Date of Patent: Jan. 6, 1987

[54] METHOD OF AND APPARATUS FOR EXAMINING AUTOMOTIVE HEADLAMP

[75] Inventors: Mamoru Yoshida; Mituo Kamemoto, both of Toyota, Japan

[73] Assignee: Toyota Jidosha Kabushiki Kaisha, Aichi, Japan

[21] Appl. No.: 631,783

[22] Filed: Jul. 17, 1984

[30] Foreign Application Priority Data

Jul. 18, 1983 [JP] Japan ................................ 58-130627

[51] Int. Cl.⁴ .............................................. G01J 1/20
[52] U.S. Cl. ..................................... 356/121; 358/107
[58] Field of Search ................. 356/121, 394; 358/107

[56] References Cited

U.S. PATENT DOCUMENTS 4,120,589 10/1978 Mima et al. .......................... 356/121

FOREIGN PATENT DOCUMENTS

0179639 11/1982 Japan ................................... 356/121
0106437 6/1983 Japan ................................... 356/121
0024232 2/1984 Japan ................................... 356/121

Primary Examiner—F. L. Evans
Assistant Examiner—Joel L. Harringa
Attorney, Agent, or Firm—Parkhurst & Oliff

[57] ABSTRACT

A method of examining the state of alignment of headlamp beam axis has the following steps: taking up by a TV camera the image of the light distribution pattern of a headlamp beam on a screen; specifying a closed curved area of illumination intensities higher than a predetermined level in the taken-up image of the light distribution pattern; determining the position of the geometrical center of the specified closed curved area and displaying the position of the geometrical center on a monitor TV; measuring the area of the specified closed curved area; comparing the measured actual area of the closed curved area with a command area; adjusting the quantity of light received by the TV camera in accordance with the result of the comparison until the measured actual area of the closed curved area becomes equal to the command area; and displaying, on a monitor TV, a pattern representing the allowable range and a mark representing the position of the beam axis. When the marks falls within the allowable range, it is judged that the state of alignment of the beam axis is acceptable.

20 Claims, 8 Drawing Figures

METHOD OF AND APPARATUS FOR EXAMINING AUTOMOTIVE HEADLAMP

BACKGROUND OF THE INVENTION

The present invention relates to a method of and an apparatus for examining the alignment of beam axes of headlamps of an automobile on an assembly line.

The specification of Japanese Patent Application No. 64841/1981 (Japanese Patent Laid-Open No. 179639/1982) discloses a headlamp testing method and apparatus for examining the beam axes of automotive headlamps. In this known art, the light beam from a headlamp to be tested is applied to a screen, and the image of the light distribution pattern formed on the screen by the beam is taken up by a TV camera to produce video signals. The video signals are then quantized at a predetermined quantizing level so as to determine a closed curved area surrounded by a line indicative of illumination intensity higher than a predetermined level. This closed curved area will be referred to hereinunder as a "hot zone". The position of the geometrical center of the thus determined hot zone is regarded as being the position of beam axis of each headlamp. Marks indicating the allowable ranges of the beam axis alignment for different types of automobile are determined beforehand and the mark corresponding to the type of automobile to be examined is displayed on a monitor TV together with the position of the geometrical center of the hot zone. The operator then visually checks whether the position of the geometrical center of the hot zone falls within the mark which indicates the allowable range. If the geometrical center of the hot zone falls within the area of the mark representing the allowable range, the headlamp beam axis alignment is judged as being acceptable. If not, however, the headlamp beam axis is adjusted until the geometrical center of the hot zone comes to fall within the area of the pattern.

This known art, however, suffers from a disadvantage in that, since the picture signals of the light distribution pattern on the screen are quantized at a specific quantization level, even headlamps with the same specification provide different sizes and outlines of hot zone areas. This disadvantage is derived from a fluctuation in the light distribution pattern or a difference in the output voltage of the batteries mounted on the automobiles. Consequently, the accuracy of adjustment often fluctuates undesirably.

This problem will be explained in more detail with specific reference to FIGS. 1A to 1C and FIG. 2.

Figure 1:
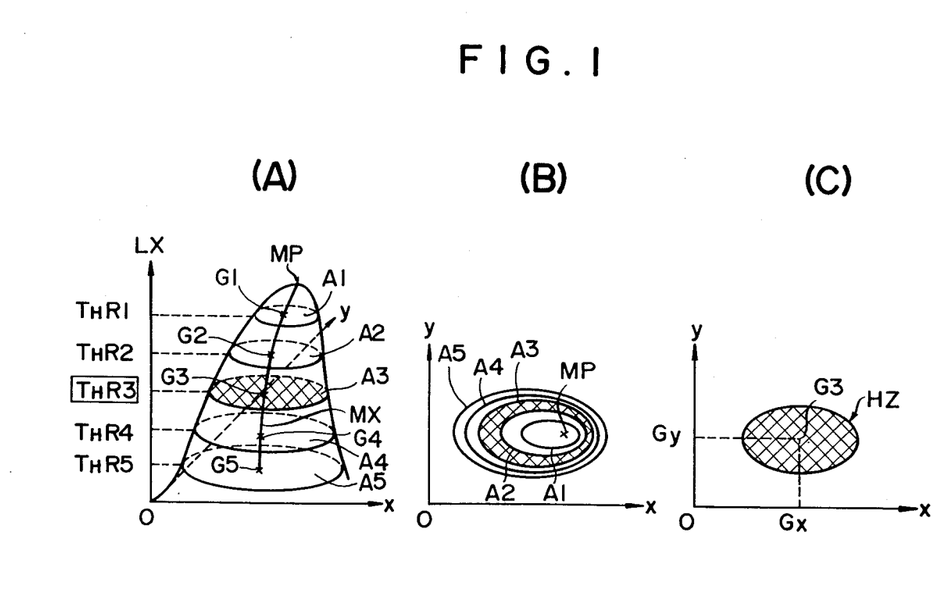
FIG. 1A is a three-dimensional illustration of the light distribution pattern of a headlamp beam.
FIG. 1B is an illustration of equi-illumination intensity closed curves.
FIG. 1C is an illustration of the relationship between a hot zone surrounded by a specific equi-illumination intensity closed curve and the position of the geometrical center G3 of the hot zone.
Figure 2:
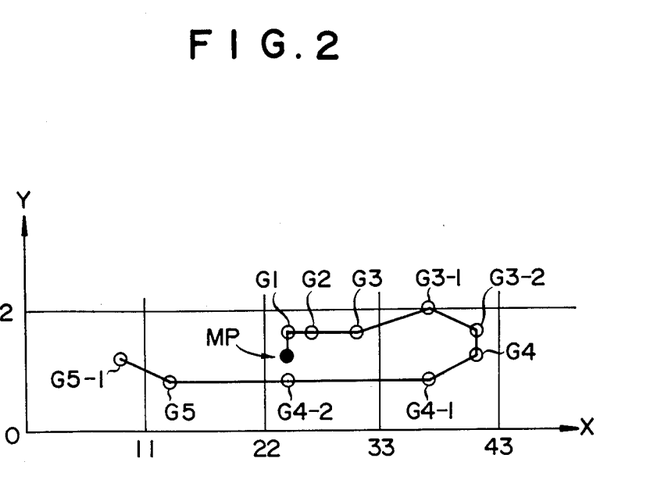
FIG. 2 is an illustration of positions of geometrical centers (positions of beam axis) in respective equi-illumination intensity closed curves of the light distribution pattern of a headlamp beam projected on a screen.

FIG. 1A is a chart which three-dimensionally shows the light distribution pattern of the headlamp beam applied to a screen. This chart is usually referred to as an "illumination intensity distribution chart". In this chart, X and Y axes represent coordinate values of the light distribution pattern on the screen, while LX axis shows the illumination intensity of the light distribution pattern. Symbols A1 to A5 denote, respectively, different closed curved areas corresponding to different illumination intensities which are represented by $T_HR1$ ro $T_HR5$. The differect closed curved areas A1–A5 are defined by lines indicating cenain levels of illumination intensity, respectively. These closed curved areas A1 to A5 have respective geometrical centers which are represented by G1 to G5. A symbol MP represents the points of the maximum illumination intensities. FIG. 1B, shows a group of the closed curved areas A1 to A5 of different illumination intensity levels which are projected on the X-Y plane to overlap each other. Thus, FIG. 1B shows the light distribution pattern of the headlamp beam applied to the screen. If the video signals of the image of this light distribution pattern taken up by the TV camera are quantized at the illumination intensity level of $T_HR3$, a hot zone HZ is obtained as shown in FIG. 1C. Obviously, this hot zone HZ corresponds to the closed curved area A3 of the illumination intensities higher than $T_HR3$ shown in FIG. 1A. In the known method of examination of the headlamp beam axis, the position of the geometrical center G3 of this hot zone HZ is determined and displayed on the monitor TV as the position of the headlamp beam axis. As will be understood from FIG. 1A, the illumination intensity distribution exhibits a three-dimensional form similar to a mountain. This form, however, is not symmetrical with respect to the line MX indicative of the headlamp beam axis. In FIG. 1A, the line MX is difined by a line connecting the geometrical centers of respective closed curved areas A1 to A5. The degree of asymmetry is greater in the region where the illumination intensity is comparatively small than in the area in which the illumination intensity is comparatively large. Consequently, when the beam axis line, i.e., the positions of the geometrical centers of respective closed curved areas, are projected on the X-Y plane, the positions of these geometrical centers fluctuate over a wide area as shown in FIG. 2. In this figure, a symbol MP represent the point of the maximum illumination intensity. Symbols G1, G2 and G3 represents the positions of the headlamp beam axis determined in accordance with the quantizing levels of $T_HR1$, $T_HR2$ and $T_HR3$. Symbols G3-1 and G3-2 show, respectively, the positions of the headlamp beam axis determined in accordance with the quantizing levels $T_HR3$-1 and $T_HR3$-2 which are intermediate between the illumination intensities $T_HR3$ and $T_HR4$. Similarly, a symbol G4 represents the position of the headlamp beam axis in accordance with $T_HR4$, while G4-1 and G4-2 represent, respectively, the positions of the headlamp beam axis in accordance with $T_HR4$-1 and $T_HR4$-2 which are intermediate between the intensities $T_HR4$ and $T_HR5$. Symbols G5 and G5-1 show the positions of the headlamp beam axis in accordance with $T_HR5$ and $T_HR5$-1, respectively. The illumination intensity $T_HR5$-1 is less than $T_HR5$.

From FIG. 2, it will be understood that the desired accuracy of examination of the alignment of the headlamp beam axis is attained if the examination is made in the region in which the fluctuation of the beam axis position is comparatively small, e.g., within the region which contains the points MP, G1, G2 and G3. In other words, it will be understood that it is prefarable to examine the alignment of the headlamp beam axis by using, as the index of the alignment, the position of the geometrical center of the closed curved area which is comparatively close to the point of the maximum illumination intensity.

In the known method explained above, the quantization of the light distribution pattern is made at a constant intensity level of $T_HR3$, for example. As stated above, even headlamps with the same specification often exhibit different patterns of illumination intensity distributions due to fluctuation of conditions such as the luminous intensity, light distribution pattern and the output voltage of the batteries mounted on the automobile. In such a case, the position of the beam axis may deviates widely from the expected beam axis position near the point of the maximum illumination intensity to the points G3-1 or G3-2 shown in FIG. 2, for example.

In order to obviate this problem, hitherto, a testing method has been proposed in which the maximum illumination intensity is determined for individual headlamps and the beam axis alignment is examined by using the position of the geometrical center of the hot zone surrounded by an illumination intensity level higher than 80% of the maximum illumination intensity. This method, however, cannot be practically carried out because an extremely complicated and troublesome process is required in order to specify the point of the maximum illumination intensity.

SUMMARY OF THE INVENTION

Accordingly, it is a primary object of the invention to provide a method of and apparatus for examining the alignment of a headlamp beam axis, in which the fluctuation in the illumination intensity distribution is automatically corrected to assure a high accuracy of examination.

To this end, the invention is directed to an improved method of and apparatus for examining the alignment of a headlamp beam axis in which the headlamp beam to be examined is applied to a screen and the image of the light distribution pattern of the beam on the screen is taken up by a TV camera. The video signals representing the image of the light distribution pattern are processed to specify a closed curved area or hot zone surrounded by a line indicative of illumination intensities higher than a predetermined level of illumination intensities, and the actual area of the thus specified hot zone is computed and compared with a predetermined command area. The quantity of light inputted into the TV camera is adjusted by a diaphragm of TV camera in accordance with the result of the comparison, until the actual area of the hot zone becomes equal to the command area. Then, the position of the geometrical center of the hot zone having the area equal to the command area is determined and is indicated on a monitor TV together with a mark which shows the allowable range within which the mark should fall after completion of the inspection.

In another aspect of the invention, the headlamp beam to be examined is applied to a screen and the image of the light distribution pattern of the beam on the screen is taken up by a TV camera. The video signals representing the image of the light distribution pattern are processed to specify a closed curved area or hot zone surrounded by a line indicative of illumination intensities higher than a predetermined level of illumination intensity. The predetermined level is automatically adjusted as explained below. The actual area of the thus specified hot zone is computed and compared with a predetermined command area. The level of the illumination intensity for specifying the closed hot zone is adjusted in accordance with the result of the comparison, until the actual area of the hot zone becomes equal to the command area. Then, the position of the geometrical center of the hot zone having the area equal to the command area is determined and is indicated on a monitor TV together with a mark which shows the allowable range within which the mark fall after completion of the inspection.

According to the invention, the area of the hot zone is controlled so as to coincide with the command area, so that it becomes possible to determine the beam axis in the illumination intensity region where the deviation of the beam axis is comparatively small. This in turn makes it possible to simplify structural elements and attain an examination accuracy equivalent to that attained by the prior art in which the leadlamp beam axis is determined by the illuminance of 80% with respect to the maximum illuminance.

In a preferred form of the invention, the position of the above-mentioned allowable range can be changed to compensate for any change caused by a change in the height of the headlamp center, and the control is conducted to obtain a coincidence between the area of the hot zone specified for the position compensation and a predetermined command area.

DESCRIPTION OF THE PREFERRED EMBODIMENTS

Figure 3:
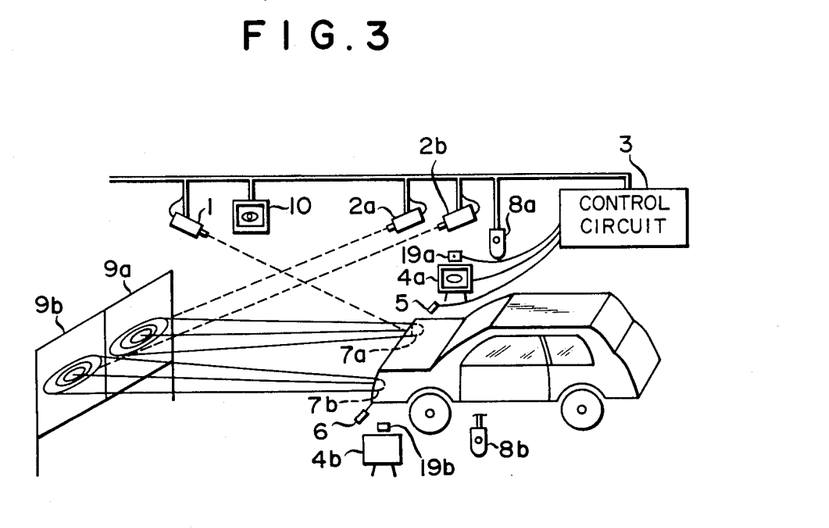
FIG. 3 is a schematic illustrative of the whole portion of an apparatus embodying the invention for examining the headlamp beam axis alignment.

Preferred embodiments of the invention will be described hereinunder with reference to FIGS. 3 to 5. Referring first to FIG. 3 showing the whole arrangement of an apparatus of the invention for examining the headlamp beam axis alignment, a TV camera 1 for measuring the height of the headlamp center of an automobile to be examined hangs from the ceiling in such a manner so as not to impede the movement of the automobile along the inspection line. A photoelectric switch composed by a pair of elements 5 and 6 is provided to detect the arrival of the automobile at a predetermined examination position. The photoelectric switch is adapted to produce a signal to enable the TV camera 1 to directly pick up the light beam from a headlamp 7a or 7b. The TV camera 1 is connected to a monitor TV 10 on which the position of the geometrical center of the light image of the headlamp 7a or 7b is displayed. The displayed position of the geometrical center is used as an index of the height of the headlamp of the vehicle to be examined. Headlight beams from the right and left headlamps are adapted to be applied to screens 9a (for right) and 9b (for left), and images on the screens 9a and 9b are adapted to be taken up by TV cameras 2a (for right) and 2b (for left), respectively. The output from each of the TV cameras 2a and 2b is connected to a control circuit 3 in which a processing such as a binary coding of the video signal is conducted to determine the position of the beam axis. The output from the control circuit 3 is also connected to monitor TVs 4a (for right) and 4b (for left) on which the result of the processing is displayed. The examination is adapted to be started as the operator or inspector pushes a push button 8a (for right) or 8b (for left) so as to select either the headlamp 7a (right) or the headlamp 7b (left) for examination. The monitor TV 4a (or 4b) is adapted to display a "+" mark which represents the position of the geometrical center of a closed curved area surrounded by a line indicative of illumination intensity higher than a predetermined level of illumination intensity. The monitor TV 4a (or 4b) is also adapted to display a mark (referred to as a window) indicative of an allowable area within which the "+" mark falls after completion of an inspection. Therefore, the inspector visually checks whether this mark "+" falls within the area of the window. This window represents the allowable range of beam axis position, and the position of this window has been corrected by the height of the automobile measured as described before. The position and the size of the window is predetermined for each type of automobile. The fact of the "+" mark, representing the beam axis position, falling within this range can be confirmed also through lighting of a pilot lamp 19a (for right) or 19b (for left).

Figure 4:
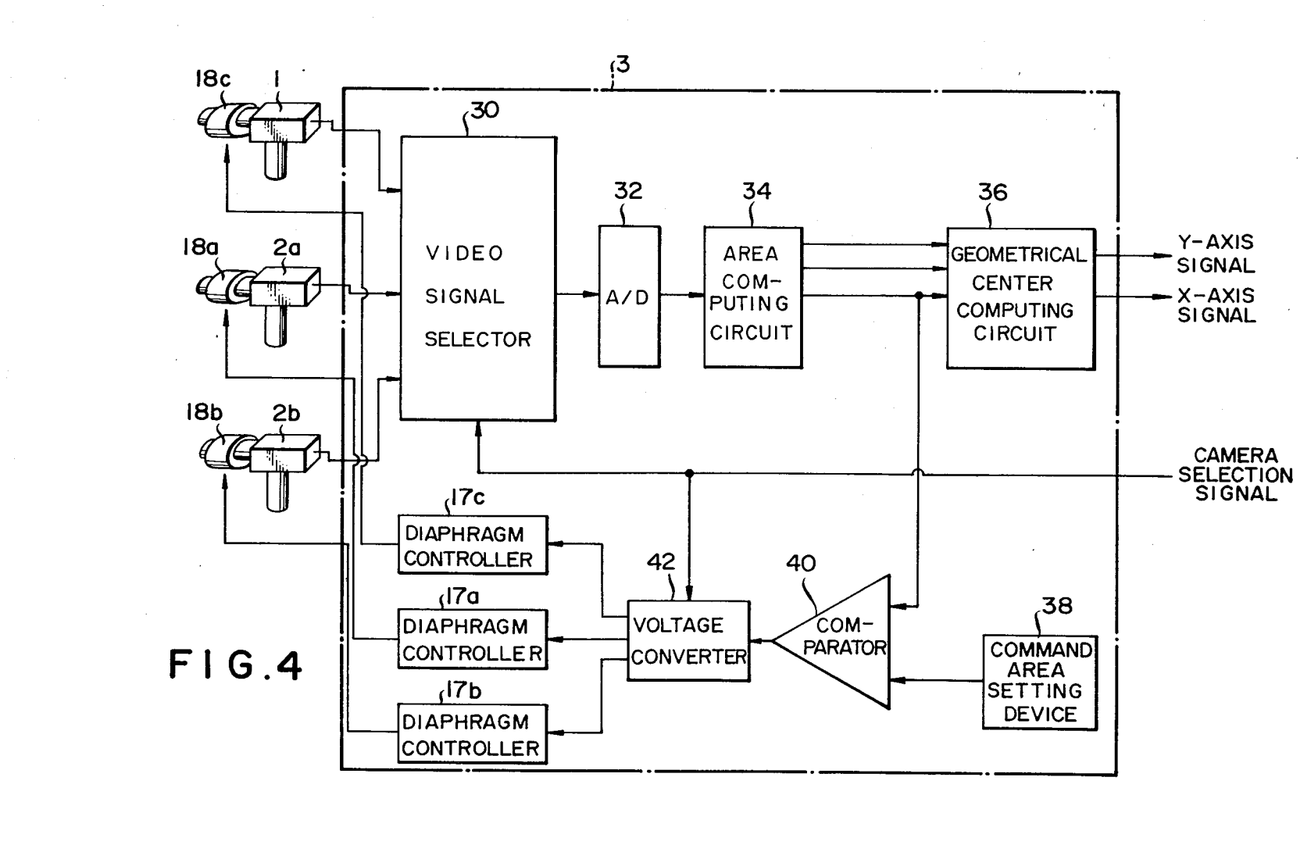
FIG. 4 is a block diagram of an essential part of the apparatus as shown in FIG. 3.

FIG. 4 shows an essential portion of the examination apparatus of the invention as shown in FIG. 3. In this Figure, the same reference numerals are used to denote the same parts or members as those in FIG. 3. The TV cameras 1,2a and 2b are provided with diaphragm driving units 18a to 18c, respectively. The diaphragm driving units 18a to 18c are connected to diaphragm controllers 17a to 17c, respectively. Thus, the light quantities received by the TV cameras 1,2a and 2b are controlled by the diaphragm controllers 17a to 17c, through the operation of the diaphragm driving units 18a and 18c.

A reference numeral 30 designates a video signal selector which is adapted to take up the video signal from one of the TV cameras appointed by a camera selection signal. More specifically, the camera selection signal is a signal for selecting one of two TV cameras 2a and 2b in response to the operation of switches 8a and 8b. The camera selection signal also selects the TV camera 1 in response to the signal from the photoelectric switch (5 and 6). An analog-to-digital converter (referred to as "A/D converter", hereinunder) 32 converts the video signal derived from the video signal selector 30 into digital signals. The A/D converter 32 is used for the purpose of quantizing the video signal at a predetermined qunatizing level, in order to determine the closed curved area of illumination intensities higher than the predetermined level in the light distribution pattern of the headlamp 7a (7b) on the screen 9a (9b) and in order to determine a closed curved area of illumination intensities higher than a predetermined level from the light directly applied by the headlamp.

The A/D converter 32 is connected to an area computing circuit 34 which computes an area of the closed curved area of light intensities higher than the predetermined level, i.e., the hot zone in the light distribution pattern on the screen, and also an area of a second closed curved area of intensities higher than a second predetermined level in the light directly applied by the headlamp. The output of the area computing circuit 34 is connected to a geometrical center computing circuit 36 which computes the positions of the geometrical centers of the closed curved areas mentioned above.

Figure 4A:
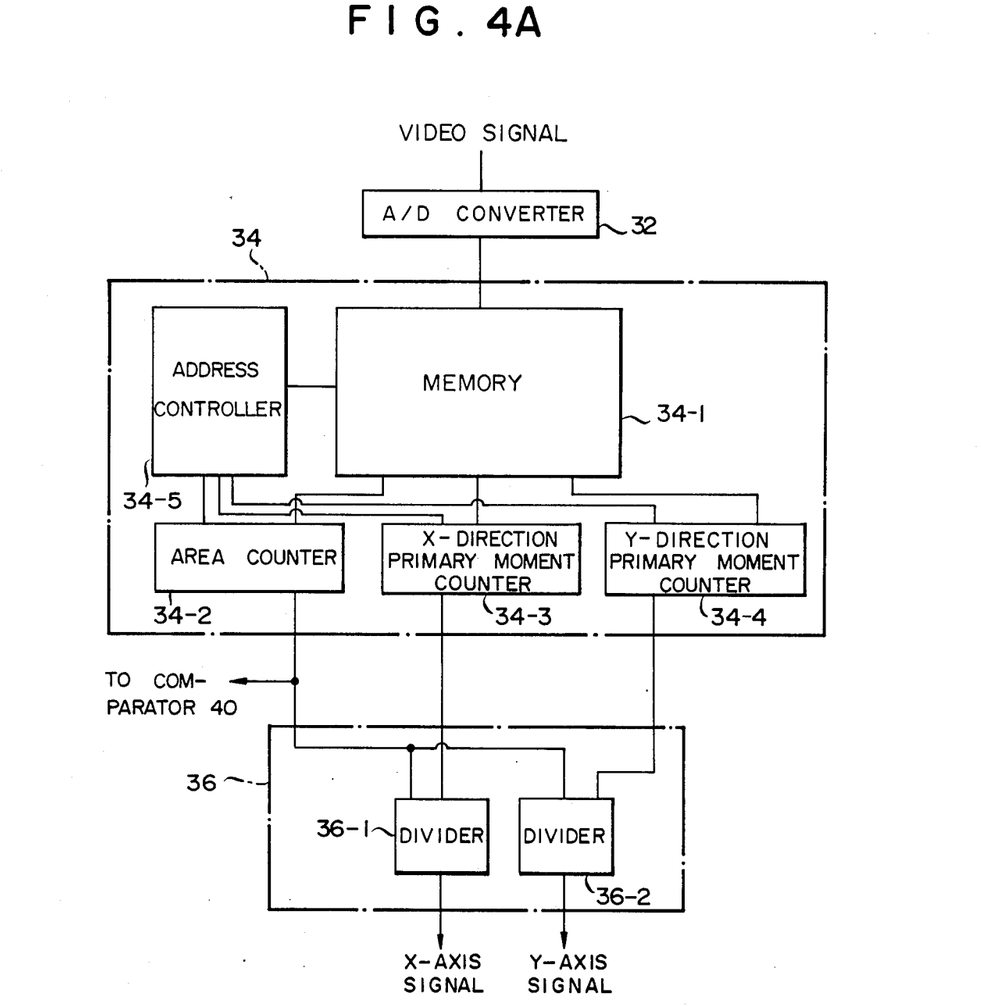
FIG. 4A is a block diagram of an example of an area computing circuit and a geometrical center computing circuit which are incorporated in the essential part of the apparatus as shown in FIG. 4.

The area computing circuit 34 and the geometrical center computing circuit 36 are shown in more detail in FIG. 4A. In FIG. 4A, the output of the A/D converter 32 is connected to an input of a memory 34-1. The A/D converter 32 successively digitizes the video signals into digital values to produce signals indicative of digital picture elements of, for example, 256×256. The thus obtained digital picture signals are stored in the memory 34-1. An area counter 34-2, X-direction primary moment counter 34-3, Y-direction primary moment counter 34-4 and an address controller 34-5 are connected to the memory 34-1, respectively. The area counter 34-2 computes the area of the hot zone or the closed curved area mentioned before, by counting the number of picture signals which represent the hot zone or the closed curved area which is expressed by the picture signals being "1", for example.

Meanwhile, the X-direction primary moment counter 34-3 counts the X-direction primary moment in a manner explained hereinunder. It is assumed here that the address in the memory is represented by means of a matrix consisting of i lines and j columns, and the picture signal located on the address i,j is expressed by Pij. Thus, when the address is within the hot zone or closed curved area of the illumination intensities higher than the predetermined level, the picture signal Pij is expressed as Pij=1, whereas, when it falls out of the hot zone or the closed curved area, the picture signal Pij is expressed as Pij=0. The primary moment in the X-axis direction, therefore, can be given by $\Sigma\Sigma i \cdot Pij$. The counter 34-3 determines the primary moment in the X-axis direction by successively counting the values of $\Sigma\Sigma i \cdot Pij$. Similarly, the Y-direction primary moment counter 34-4 successively counts the values of $\Sigma\Sigma j \cdot Pij$ to determine the primary moment in the Y-axis direction.

The area of the hot zone or the closed curved area mentioned above, computed by the area counter 34-2, is represented by $\Sigma\Sigma Pij$. The position of the geometrical center (Gx,Gy) of the hot zone or the closed curved area, therefore, is expressed as follows.

$$(Gx, Gy) = \left( \frac{\Sigma\Sigma i \cdot Pij}{\Sigma\Sigma Pij}, \frac{\Sigma\Sigma j \cdot Pij}{\Sigma\Sigma Pij} \right) \quad (1)$$

The area counter 34-2, X-direction primary moment counter 34-3 and the Y-direction primary moment counter 34-4, which are the constituents of the area computing circuit 34, are connected to the geometrical center computing circuit 36. This computing circuit 36 comprises dividers 36-1 and 36-2. The divider 36-1 is used for the determination of the X-axis coordinate value of the geometrical center of the hot zone or the curved closed area, while the divider 36-2 is for determining the Y-axis coordinate value of the same. The divider 36-1, therefore, conducts a dividing computation to determine the value of $\Sigma\Sigma i \cdot Pij / \Sigma\Sigma Pij$, upon receipt of output signals from the area counter 34-2 and the X-direction primary moment counter 34-3, thereby to produce a signal Gx which represents the X-axis coordinate value of the geometrical center. Similarly, the divider 36-2 conducts a computation of $\Sigma\Sigma i \cdot Pij / \Sigma\Sigma Pij$, upon receipt of outputs from the area counter 34-2 and the Y-axis moment counter 34-4, thereby to produce a signal Gy which represents the Y-axis coordinate value of the position of the geometrical center.

Referring again to FIG. 4, the output of the area counter 34-2 of the area computing circuit 34 is connected to one of the inputs of a digital comparator 40. The other input to the comparator 40 is connected to the output of a command area setting device 38 which represents the command area of the hot zone or the closed curved area. Different command areas are determined beforehand for different types of automobiles. The output of the comparator 40 is connected to a voltage converter 42 which includes at least a digital-to-analog converter which converts a digital difference signal, which is the result of the comparison made by the comparator 40, into an analog difference signal. The outputs of the voltage converter 42 are connected to the inputs of the lens diaphragm controllers 17a to 17c, respectively. In order to determine which one of the diaphragm controllers 17a to 17c the output from the voltage converter 42 should be delivered to, the camera selection signal mentioned before is inputted to the voltage converter 42.

The apparatus of the invention, having the described construction, operates in a manner explained hereinunder.

Upon receipt of the camera selection signal, the video signal selector 30 selects one of the video signals from the TV cameras 1,2a and 2b, and delivers the selected video signal to the A/D converter 32. The inputted video signal is quantized at a predetermined quantizing level of voltage by the A/D converter 32 to become a digital signal which is then inputted to the memory 34-1 of the area computing circuit 34. In the described embodiment, the picture signals of addresses corresponding to the hot zone or the closed curved area of illumination intensities higher than a predetermined level are stored as "1". The picture signals in the memory 34-1 are successively delivered to the area counter 34-2 under the control of the address controllers 34-5, so that the area counter 34-2 produces an output representing the area of the closed curved area. The picture signals in the memory 34-1 are successively delivered to the X-direction primary moment counter 34-3 and the Y-direction primary moment counter 34-4. The picture signals of respective addresses and the values of the addresses related to the X-direction are multiplied and the results of the multiplication are counted by the counter 34-3 the count of which is indicative of $\Sigma\Sigma i \cdot pij$. On the other hand, the picture signals of respective addresses and the values of the addresses related to the Y-direction are multiplied and the results of the multiplication are counted by the counters 34-4 the count of which is indicative of $\Sigma\Sigma j \cdot pij$. The values counted by three counters 34-2, 34-3 and 34-4 are inputted to the computing circuit 36. The values counted by the X-direction primary moment counter 34-3 and the area counter 34-2 are inputted to the divider 36-1 which executes the computation in accordance with the formula (1) to determine the X-coordinate values of the geometrical center of the closed curved area. Consequently, the divider 36-1 delivers an X-axis signal representing the X-coordinate value of the geometrical center of the closed curved area. Similarly, the divider 36-2 produces a Y-axis signal. When either the TV camera 2a or 2b has been selected by the camera selecting signal, the output from the area counter 34-2 represents the area of the hot zone on the screen, while the outputs from the computing circuit 36 represents the X and Y coordinate values of the geometrical center of the hot zone on the screen, i.e. the position of the beam axis of the headlamp. On the other hand, if the TV camera 1 for directly picking up the light from the headlamp has been selected by the camera selection signal, the output from the area counter 34-2 represents the area of the closed curved area of the light directly applied by the headlamp, while the outputs from the computing circuit 36 represents the position of the geometrical center of this closed curved area. In this case, the height of the headlamp center of the automobile to be examined can be known from the Y-axis signal of the computing circuit 36. It is, therefore, possible to correct the position of the window representing the allowable range of the beam axis position on each of the monitor TVs 4a and 4b, in accordance with the Y-axis signal, i.e. the measured height of the headlamp center of the automobile.

On the other hand, the comparator 40 compares the actual area computed by the area computing circuit 34 with a command value which is set by the setting device 38, and produces an output corresponding to the difference between these two area values. This difference signal is delivered through the voltage converter 42 to either one of the diaphragm controllers 17a and 17b for controlling the diaphragm driving unit 17a or 17b of the TV camera appointed by the camera selection signal. The diaphragm controller 17a or 17b then delivers a driving signal to the associated diaphragm driving unit.

Consequently, the diaphragm driving unit operates until the level of the output from the comparator 40 is reduced to zero, so that an automatic correction is effected to attain conformity between the actual area of the hot zone and the command area.

To explain in more detail, the video signal selector 30 first selects the video signal from the TV camera 1, in response to the output from the photoelectric switch 5 and 6, and the thus selected video signal is binarily coded by the A/D converter at a predetermined level of voltage. The picture signals corresponding to the addresses in the closed curved area defined by an equal constant illumination intensity curve corresponding to the above-mentioned voltage level are stored as "1" in the memory 34-1, while the picture signals of addresses out of this closed curved area are stored as "0" in the memory 34-1. The signals thus stored in the memory 34-1 are successively taken into the area counter 34-2 which computes the actual area of the closed curved area. Meanwhile, the X-direction primary moment counter 34-3 and the Y-direction primary moment counter 34-4 compute the primary moment in the X-direction and the primary moment in the Y-direction, respectively. The outputs from these counters 34-2, 34-3 and 34-4 are delivered to a computing circuit 36 which produces signals representing the position Gx,Gy of the geometrical center of the closed curved area of illumination intensities higher than the predetermined level. The value Gy representing the Y-coordinate value of the position of geometrical center is compared with the standard Y-coordinate value which represents the standard height of the headlamp center of the automobile, and the predetermined positions of the windows representing the allowable ranges in respective monitor TVs 4a and 4b are corrected in accordance with the result of this comparison.

Then, the operator or inspector manipulates a switch 8a or 8b so that the video signal from either one of the TV cameras 2a and 2b, corresponding to the manipulated switch 8a or 8b, is selected by the video signal selector 30, and the selected video signal is binarily coded by the A/D converter 32 at a predetermined level of voltage. The picture signals thus produced are stored in the memory 34-1. More particularly, only the picture signals corresponding to the closed curved area are stored as "1" in the memory 34-1. The picture signals are processed in the same manner as that explained before so that X- and Y-axis signals representing the position of geometrical center of the closed curved area are obtained.

The X- and Y-axis signals are delivered to, for example, a video controller which is not shown, so that a mark "+" representing the position of beam axis of the automobile under examination is displayed on the monitor TV. In case the signal from the comparator 40 comes down below "zero", the position of the window representing the allowable range, as well as the position of "+" mark, are corrected no more but are fixed.

An explanation will be made hereinunder as to another aspect of the headlamp beam axis examining apparatus of the invention. In this figure, the same reference numerals are used to denote aimilar circuit elements as those in FIG. 4.

Figure 5:
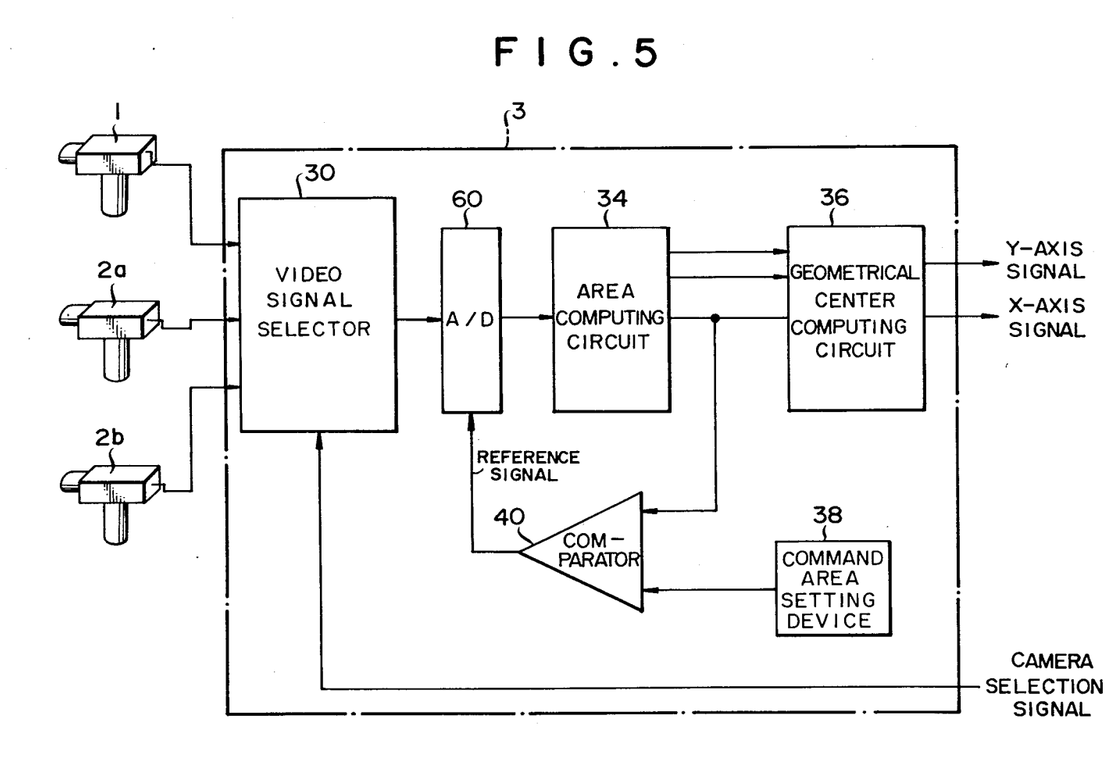
FIG. 5 is a block diagram of an essential part of another embodiment of the apparatus of the invention for examining the headlamp beam axis alignment.

In an embodiment shown in FIG. 5, in order to make the actual area of the hot zone coincide with the command area, the level of quantization of the video signal from the TV camera is changed in accordance with the output from the comparator 40, unlike the embodiment shown in FIG. 4 in which the light quantity taken up by the TV camera is changed in response to the output from the comparator 40. Namely, in the embodiment shown in FIG. 5, the output from the comparator 40, which represents the difference between the actual area of the closed curved area and the command area, is used as the reference signal which determines quantizing level at which the video signal from the TV camera is quantized by the A/D converter 60. The A/D converter 60 convents the video signal of voltage exceeding the predetermined voltage corresponding to the reference signal into digital signal "1", while converting the video signals below the predetermined voltage into digital signal "0". Therefore, when the output from the comparator 40 indicates that the actual area is smaller than the command area, the voltage level at which the A/D conversion is made is increased to increase the actual area of the closed curved area until it becomes equal to the command area. On the other hand, when the actual area is greater than the command area, the level of A/D conversion is lowered to reduce the actual area of the closed curved area to the same level as the command area. When the output from the comparator 40 is at a zero level, i.e., when the actual area of the closed curved area coincides with the command area, the adjustment of the level of the conversion voltage of the A/D converter is finished so that the instant level of the illumination intensity is fixed. Consequently, the X-axis signal and the Y-axis coordinate signal representing the position of the beam axis, outputted from the geometrical center computing circuit 36, are also fixed.

The position of display of the "+" mark representing the position of the beam axis on the monitor TVs 4a and 4b are determined in accordance with these X-and Y-axis signals, and the "+" mark is displayed at the position thus determined. Then, an adjustment of the headlamp is made until this mark "+" falls within the range indicated by the window showing the allowable range.

What is claimed is:

1. A method of examining an alignment of headlamp beam of an automobile in which a first mark representing a position of a headlamp beam axis and a second mark representing an allowable range for the headlamp beam axis are displayed on a monitor TV and when said first mark falls within said allowable range, a judgement is made that the alignment of the beam axis is acceptable, comprising the steps of:
    taking up by a TV camera an image of a light distribution pattern of a headlamp beam on a screen;
    specifying a closed curved area surrounded by a line indicative of illumination intensity higher than a predetermined level in the taken-up image of the light distribution pattern;
    determining a position of a geometrical center of the specified closed curved area to display the position of the geometrical center on the monitor TV;
    measuring an area of the specified closed curved area;
    comparing the measured actual area of said specified closed curved area with a command area; and
    adjusting a quantity of light received by said TV camera in accordance with the result of the comparison until the measured actual area of said closed curved area becomes equal to said command area.

2. A headlamp examining method according to claim 1, further comprising the steps of: measuring a height of the headlamp center of the automobile to be examined; and correcting a position of said second mark in accordance with the result of measurement of the automobile height.

3. A headlamp examining method according to claim 2, wherein said step of correcting the position of the second mark of allowable range includes the steps of:
    taking up a second image of the headlamp beam directly applied by the headlamp;
    specifying a second closed curved area surrounded by a line indicative of illumination intensity higher than a second predetermined level of illumination intensity in the second taken-up image;
    determining a second position of a geometrical center of the second specified closed curved area;
    comparing said second position of the geometrical center with a predetermined standard value of the height of the headlamp center; and
    correcting the position of said second mark in accordance with the result of the comparison for height of the headlamp center.

4. An apparatus for examining an alignment of headlamp beam of an automobile in which a first mark representing a position of a headlamp beam axis and a second mark representing an allowable range for the headlamp beam axis are displayed on a monitor TV and when said first mark falls within said allowable range, a judgement is made that the alignment of the beam axis is acceptable, comprising:
    means for taking up an image of a light distribution pattern of a headlamp beam on a screen to produce a video signal;
    means for specifying a closed curved area surrounded by a line indicative of illumination intensity higher than a predetermined level in the taken-up image of the light distribution pattern;
    means for determining a position of a geometrical center of the specified closed curved area to display the position of the geometrical center on the monitor TV;

means for measuring an area of the specified closed curved area;

means for comparing the measured actual area of said specified closed curved area with a command area; and means for adjusting a quantity of light received by said taking up means in accordance with the result of the comparison until the measured actual area of said closed curved area becomes equal to said command area.

5. An apparatus for examining an alignment of headlamp beam according to claim 4, further comprising means for measuring a height of the headlamp center of the automobile to be examined; and means for correcting the position of said second mark in accordance with the result of measurement of the height of the headlamp center.

6. An apparatus for examining an alignment of headlamp beam according to claim 5, wherein said means for correcting the position of the second mark of allowable range includes:

means for taking up a second image of the headlamp beam directly applied by the headlamp;

means for specifying a second closed curved area surrounded by a line indicative of illumination intensity higher than a second predetermined level of illumination intensity in the second taken-up image;

means for determining a second position of a geometrical center of the second specified closed curved area;

means for comparing said second position of the geometrical center with a predetermined standard value of the height of the headlamp center; and means for correcting the position of said mark in accordance with the result of the comparison for height of the headlamp center.

7. An apparatus for examining an alignment of headlamp beam according to claim 4 wherein said specifying means quantizes said video signal at a predetermined voltage to produce binary coded signals representing picture elements in and out of said closed curved area.

8. An apparatus for examining an alignment of headlamp beam according to claim 7, wherein said means for determining the position of the geometrical center comprises memory means for storing said binary coded signals and calaculates the following formula to determine said geometrical center $$(Gx, Gy) = \left( \frac{\Sigma\Sigma i \cdot Pij}{\Sigma\Sigma Pij}, \frac{\Sigma\Sigma j \cdot Pij}{\Sigma\Sigma Pij} \right)$$

wherein; Gx represents the position of the geometrical center on the X-axis, Gy represents the position of the geometrical center on the Y-axis, i and j represent addresses of said memory means, picture elements in said closed curved area in the said memory are expressed by Pij=1 and picture elements out of said closed curved area in said memory are expressed by Pij=0.

9. An apparatus for examining an alignment of headlamp beam according to claim 8, further comprising means for measuring a height of the headlamp center of the automobile to be examined; and means for correcting the position of said second mark in accordance with the result of measurement of the height of the headlamp center.

10. An apparatus for examining an alignment of headlamp beam according to claim 9, wherein said means for correcting the position of the second mark of allowable range includes:

means for taking up a second image of the headlamp beam directly applied by the headlamp;

means for determining a second position of a geometrical center of a second closed curved area of illuminance higher than a second predetermined level in a picture of the taken-up image;

means for comparing said second position of the geometrical center with a predetermined standard value of the height of the headlamp center; and means for correcting the second position of said second mark in accordance with the result of the comparison for height of the headlamp center.

11. A method of examining an alignment of headlamp beam of an automobile in which a first mark representing a position of a headlamp beam axis and a second mark representing an allowable range for the headlamp beam axis are displayed on a monitor TV and when said first mark falls within said allowable range, a judgement is made that the alignment of the beam axis is acceptable, comprising the steps of:

taking up by a TV camera an image of a light distribution pattern of a headlamp beam on a screen;

specifying a closed curved area surrounded by a line indicative of illumination intensity higher than a predetermined level in the taken-up image of the light distribution pattern;

determining a position of a geometrical center of the specified closed curved area to display the position of the geometrical center on the monitor TV;

measuring an area of the specified closed curved area;

comparing the measured actual area of said specified closed curved area with a command area; and adjusting said predetermined level in accordance with the result of the comparison until the measured actual area of said closed curved area becomes equal to said command area.

12. A headlamp examining method according to claim 11, further comprising the steps of: measuring a height of the headlamp center of the automobile to be examined; and correcting a position of said second mark in accordance with the result of measurement of the height of the headlamp center.

13. A headlamp examining method according to claim 11, wherein said step of correcting the position of the second mark of allowable range includes the steps of:

taking up a second image of the headlamp beam directly applied by the headlamp;

specifying a second closed curved area surrounded by a line indicative of illumination intensity higher than a second predetermined level of illumination intensity in the second taken-up image;

determining a second position of a geometrical center of the second specified closed curved area;

comparing said second position of the geometrical center with a predetermined standard value of the height of the headlamp center; and correcting the position of said second mark in accordance with the result of the comparison.

14. An apparatus for examining an alignment of headlamp beam of an automobile in which a first mark representing a position of a headlamp beam axis and a second mark representing an allowable range for the headlamp beam axis are displayed on a monitor TV and when said first mark falls within said allowable range, a judgement is made that the alignment of the beam axis is acceptable, comprising:

- means for taking up an image of a light distribution pattern of a headlamp beam on a screen to produce a video signal;
- means for specifying a closed curved area surrounded by a line indicative of illumination intensity higher than a predetermined level in the taken-up image of the light distribution pattern;
- means for determining a position of a geometrical center of the specified closed curved area to display the position of the geometrical center on the monitor TV;
- means for measuring an area of the specified closed curved area;
- means for comparing the measured actual area of said specified closed curved area with a command area; and
- means for adjusting said predetermined level in accordance with the result of the comparison until the measured actual area of said closed curved area becomes equal to said command area.

15. An apparatus for examining an alignment of headlamp beam according to claim 14, further comprising means for measuring a height of the headlamp center of the automobile to be examined; and means for correcting the position of said second mark in accordance with the result of measurement of the height of the headlamp center.

16. An apparatus for examining an alignment of headlamp beam according to claim 15, wherein said means for correcting the position of the second mark of allowable range includes:

- means for taking up a second image of the headlamp beam directly applied by the headlamp;
- means for specifying a second closed curved area surrounded by a line indicative of illumination intensity higher than a second predetermined level of illumination intensity in the second taken-up image;
- means for determining a second position of a geometrical center of the second specified closed curved area;
- means for comparing said second position of the geometrical center with a predetermined standard value of the height of the headlamp center; and
- means for correcting the position of said mark in accordance with the result of the comparison for height of the headlamp center.

17. An apparatus for examining an alignment of headlamp beam according to claim 14 wherein said specifying means quantizes said video signal at a predetermined voltage to produce binary coded signals representing picture elements in and out of said closed curved area.

18. An apparatus for examining an alignment of headlamp beam according to claim 17, wherein said means for determining the position of the geometrical center comprises memory means for storing said binary coded signals and calculates the following formula to determine said geometrical center $$(Gx, Gy) = \left( \frac{\Sigma \Sigma i \cdot Pij}{\Sigma \Sigma Pij}, \frac{\Sigma \Sigma j \cdot Pij}{\Sigma \Sigma Pij} \right)$$

where; Gx represents the position of the geometrical center on the X-axis, Gy represents the position of the geometrical center on the Y-axis, i and j represent addresses of said memory means, picture elements in said closed curved area in said memory are expressed by $Pij = 1$ and picture elements out of said closed curved area in said memory are expressed by $Pij = 0$.

19. An apparatus for examining an alignment of headlamp beam according to claim 18, further comprising means for measuring a height of the headlamp center of the automobile to be examined; and means for correcting the position of said second mark in accordance with the result of measurement of the height of the headlamp center.

20. An apparatus for examining an alignment of headlamp beam according to claim 19, wherein said means for correcting the position of the mark of allowable range includes:

- means for taking up a second image of the headlamp beam directly applied by the headlamp;
- means for determining a second position of a geometrical center of a second closed curved area surrounded by a line indicative of illuminance higher than a second predetermined level in a picture of the taken-up image;
- means for comparing said second position of the geometrical center with a predetermined standard value of the height of the headlamp center; and
- means for correcting the second position of said second mark in accordance with the result of the comparison for height of the headlamp center.

* * * * *